United States Patent
Massetti et al.

(10) Patent No.: US 7,128,169 B2
(45) Date of Patent: *Oct. 31, 2006

(54) METHOD FOR THE REMOVAL AND RECOVERY OF THE OILY COMPONENT FROM DRILL CUTTINGS WITH LIQUID $CO_2$

(75) Inventors: Felicia Massetti, Castelnuovo di Porto (IT); Alessandro Nardella, Rome (IT); Raffaele Tomaciello, Mentana (IT); Alberto Guarneri, Casalbuttano (IT)

(73) Assignees: ENI S.p.A., Rome (IT); Enitecnologie S.p.A., San Donato Milanesa (IT)

( * ) Notice: Subject to any disclaimer, the term of this patent is extended or adjusted under 35 U.S.C. 154(b) by 210 days.

This patent is subject to a terminal disclaimer.

(21) Appl. No.: 10/736,743

(22) Filed: Dec. 17, 2003

(65) Prior Publication Data

US 2004/0195153 A1    Oct. 7, 2004

(30) Foreign Application Priority Data

Dec. 20, 2002  (IT)  ........................... MI2002A2708

(51) Int. Cl.
*E21B 21/06*     (2006.01)
(52) U.S. Cl. .................. 175/66; 134/12; 134/25.5; 134/40; 210/747

(58) Field of Classification Search ............... 175/66, 175/206, 207; 134/12, 25.1, 25.5, 40; 210/747
See application file for complete search history.

(56) References Cited

U.S. PATENT DOCUMENTS

| 4,434,028 A | 2/1984 | Eppig et al. |
| 5,053,082 A | 10/1991 | Flanigan et al. |
| 2002/0144717 A1 | 10/2002 | Tunnicliffe et al. |
| 2003/0136747 A1* | 7/2003 | Wood et al. ................ 210/774 |
| 2004/0065353 A1* | 4/2004 | Tunnicliffe et al. ........... 134/26 |

FOREIGN PATENT DOCUMENTS

| JP | 4-293890 | 10/1992 |
| WO | WO 02/064233 | 8/2002 |
| WO | WO 2003/063998 | 8/2003 |

* cited by examiner

*Primary Examiner*—George Suchfield
(74) *Attorney, Agent, or Firm*—Oblon, Spivak, McClelland, Maier & Neustadt, P.C.

(57) ABSTRACT

Method for the removal and recovery of the oily component from cuttings coming from the drilling of oil wells by treatment of the cuttings with a solvent, which can be compressed to the liquid state, at a pressure value ranging from 45 to 80 bar and a temperature corresponding to the saturation value.

10 Claims, 1 Drawing Sheet

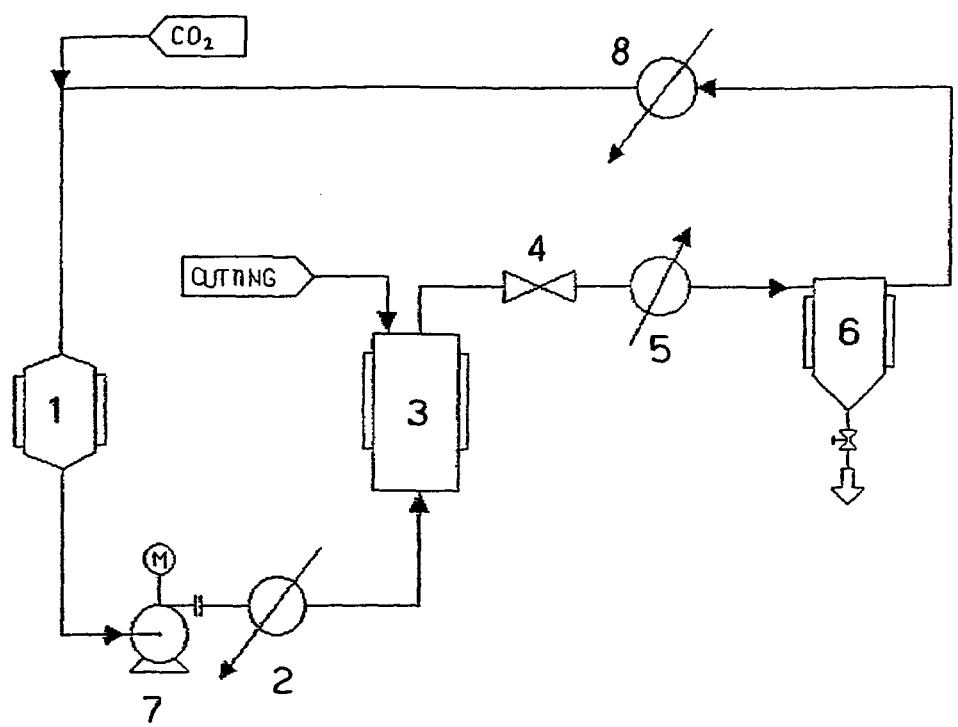
Figure

METHOD FOR THE REMOVAL AND RECOVERY OF THE OILY COMPONENT FROM DRILL CUTTINGS WITH LIQUID $CO_2$

The present invention relates to a method for the treatment of oily drill cuttings from oil wells.

More specifically, the present invention relates to a method for the removal and recovery of the oily component from drill cuttings which allows the contemporaneous de-classification of the cutting from dangerous waste-products.

The term "drill cuttings", as used in the present description and claims indicates the crushed material produced during the drilling mixed with drilling sludge. This is therefore a fluid with a rheology typical of aqueous suspensions with a high solid content such as sludge or slurry.

It is known that the function of drilling sludge is to consolidate the walls of the hole of an oil well, protect the metallic parts from corrosion, cool and lubricate the bit during drilling. Sludge, which can be water-based or oil-based, also supplies the pressure for keeping the geological formation integral and has the function of carrying the cuttings produced in the excavation by the action of the bit, to the surface. Oil sludge consists, for example, of mineral oil, barite, bentonite and other additives such as emulsifying agents and polymers.

In the past drill cuttings, mostly coming from off-shore platforms, were discharged into the sea creating an unacceptable environmental impact level. There are also considerable problems with respect to dispersion on the ground.

Various methods are used for removing oil sludge from cuttings: among these, washing systems with detergents, thermal and distillation systems. The main disadvantages of these methods are respectively linked to low efficiency, limited safety, especially when operating off-shore, high costs and plant construction complexity.

The use of a compressible solvent for the recovery of oil from drill cuttings, with acceptable residual concentration levels in the solid, was proposed with reference to "super-critical processes" i.e. bringing the fluid above its critical conditions during the treatment of the cutting. The application, described in S. Saintpère et al. (2000), "Supercritical $CO_2$ extraction applied to oily drilling cuttings", SPE 63126, SPE International, using carbon dioxide ($CO_2$), is not competitive from an economical point of view.

It was also verified that the treatment process effected with $CO_2$ under supercritical conditions is strongly conditioned by the physico-chemical characteristics of the cutting which jeopardizes the removal efficacy, in terms of oil recovery and residual concentration in the solid.

The Applicant has now found that the oily part of cuttings coming from the drilling of oil wells can be removed with an extraction method which uses, as solvent, $CO_2$ in the liquid state, obtaining an oil with the same characteristics as the mud formulation product and which, when suitable additives are added, can be re-used in other drillings whereas the solid part (cuttings) can be re-admitted into the environment or sent for conventional disposal.

With respect to $CO_2$ brought to so-called "supercritical" conditions, or beyond the critical point, the use of $CO_2$ in liquid phase has the following advantages:

lower dehydration of the solid phase and consequently lower water production to be sent to the treatment;

decrease in the plant costs, to be attributed to the limited operating pressures, in terms of equipment and piping.

In addition, the oily fraction removed with the use of the compressible fluid is completely recovered at the end of the process, without being contaminated by processing solvents and can be used again for subsequent processings, following refining processes and/or the addition of suitable additives.

The use as solvent of a fluid compatible with problems associated with pollution, such as $CO_2$, is in line with the growing demand for environmental protection, as a result of the non-dangerous nature of the fluid and also because of the absolute lack of contaminating waste-products deriving from the process.

In accordance with this, the object of the present invention relates to a method for the decontamination of oily cuttings, coming from the drilling of oil wells, and the contemporaneous recovery of the oily component, comprising the following steps:

a) treatment of said cuttings with $CO_2$ in the liquid state at a pressure value ranging from 45 to 80 bar and a temperature corresponding to the saturation value; the operation takes place by continuously feeding the solvent, in liquid phase, to the vessel containing the cuttings, in a ratio from 2 to 20 times by weight with respect to the cuttings;

b) separation of the liquid phase (solution) from the solid phase; the solid phase remains confined inside the treatment vessel;

c) expansion of the solution leaving step (b), separation of the oily phase and recycling of the $CO_2$ in vapour phase; the oily phase is discharged and recovered from the expansion vessel;

d) compression and cooling of the $CO_2$ vapour and its recycling to step (a), after optional under-cooling.

The above-discussed separation occurs at a pressure ranging from 30 to 60 bar.

More specifically, the present invention is illustrated in the enclosed claims.

The method according to the present invention has considerable advantages both from an economical and environmental point of view. The drill cuttings defined by the current regulations as being harmful waste-products have such characteristics as to make them, after treatment, compatible with the environment, whereas the oily part removed can be re-used as drilling sludge, with the addition of possible additives.

The solvent used is inert under the process and environmental conditions. The process operates with a closed cycle, with complete recycling of the $CO_2$.

The method, object of the present invention, involves the use of small dimensional machines and consequently with the possibility of use also for off-shore applications. From an economical point of view, moreover, the present method seems to be of great interest with respect to alternative on-shore processes.

An applicative example referring to the removal of the oily fraction from a conventional cutting, is provided hereunder for purely illustrative purposes.

BRIEF DESCRIPTION OF THE DRAWING

The FIGURE is a schematic block diagram illustrating an apparatus for decontaminating oily cuttings.

EXAMPLE

A typical embodiment of the method, object of the present invention, is schematized in the block scheme illustrated in the enclosed FIGURE.

The cutting to be treated is charged into the extractor (3), according to the known art.

The extractor is equipped with filtrating septa up- and down-stream, generally made of porous steel, for limiting the cutting.

After closing, the extractor is pressurized with the $CO_2$ in vapour phase, taken from the accumulation tank (1). The pressurization can be effected from the inlet situated at the bottom of the vessel or from the inlet situated at the head, generally from the bottom.

When a pressure value is reached, which is close to that of the accumulation tank, the vapour feeding is interrupted and the extractor is fed with the $CO_2$ in liquid phase, still from the accumulation tank.

The complete filling of the reactor is obtained by acting on the volumetric pump situated upstream of the extractor, by sucking the liquid $CO_2$ from the accumulation tank.

The liquid $CO_2$ is closely distributed in the cutting, dissolving the oily fraction.

The whole plant is pressurized following an analogous procedure, in all parts. The removal phase begins by continuously feeding the liquid $CO_2$ to the extractor using the pumping system, with the extractor situated in line with respect to the solvent flow.

The liquid solution leaving the extractor, consisting of the $CO_2$ solvent and the dissolved oily fraction, flows through the lamination valve (4) undergoing decompression at a lower pressure value. The oily fraction is thus continuously removed from the cutting.

The liquid-vapour mixture which is formed following lamination, is sent to a heat exchanger (5) which has the function of bringing the $CO_2$ solvent forming the mixture to vapour phase, whereas the oily fraction is separated from the stream as liquid phase.

The mixture of $CO_2$ vapour—liquid oily phase is passed through a separator with a cyclone effect (6), or a series of several separators with a gravimetric and cyclone effect, to obtain the complete separation of the liquid oily fraction from the $CO_2$ vapour stream.

An additional separation filter can complete the configuration of the separation section.

The liquid oily fraction is collected at the bottom of the separator or separators, from which it is removed by an intermittent vent through the valve situated at the bottom of each separator.

The $CO_2$ in aeriform vapour-gas phase leaving the separation section is cooled and condensed (8), and recovered in the accumulation tank (1), from where, after under-cooling (2), it is used for re-starting the extraction cycle.

With reference to the removal cycle, the moving of the solvent takes place by means of a volumetric pump (7) which sucks the liquid leaving the accumulation tank (1) and compresses it at the pressure value of the accumulation tank.

The removal phase is prolonged until the required recovery parameter is reached, referring to the percentage of oily fraction removed with respect to its initial content in the cutting (removal percentage), or the percentage of oily fraction removed referring to the quantity of raw cutting treated (yield percentage).

The time parameter of the removal process is provided by the ratio between the quantity of $CO_2$ used with respect to the weight unit of cutting treated. This weight ratio depends on the process parameters, the type of solvent used, and the type of cutting treated, and ranges from 4 to 30, generally 10.

When the removal phase has been interrupted by the stopping of the continuous flow of $CO_2$, the extractor is isolated and the solvent contained therein is recovered using an auxiliary compressor, necessary in this phase for compressing the vapour at the pressure of the accumulation tank.

The recovery phase of the $CO_2$ is followed by the final depressurization phase to the atmospheric value and subsequently the recovery of the cutting treated, following the known procedures.

The data referring to a test carried out according to the procedure described above are as follows:

| | |
|---|---|
| Solvent fluid | carbon dioxide ($CO_2$) |
| Type of cutting | conventional |
| Initial oil content | 9.5% |
| Extraction pressure | 68 bar |
| Extraction temperature | 20° C. |
| Ratio between $CO_2$ referring to the cutting | 9 kg/kg |
| Final oil content | 1.0% |
| Oil removal degree | >90% |

The invention claimed is:

1. A method for decontamination of oily cuttings, coming from drilling oil wells, and recovery of an oily component, comprising:
    mixing said cuttings with $CO_2$ in a liquid state at a pressure ranging from 45 to 70 bar and a temperature corresponding to a saturation value, to dissolve an oily fraction of the cuttings;
    removing a liquid phase including the $CO_2$ and the oily fraction from the cuttings;
    expansion and heating of the liquid phase to recover the oily fraction discharged, and to recover the $CO_2$ in a vapor phase;
    cooling and condensation of the $CO_2$ in the vapor phase for use in a subsequent mixing with other cuttings.

2. The method according to claim 1, wherein separation of the oily fraction by at least one of the removing of the liquid phase and the expansion and the heating of the liquid phase occurs at a pressure ranging from 30 to 60 bar.

3. The method according to claim 1 or claim 2, wherein the mixing of the cuttings and separation of the oily fraction by at least one of the removing of the liquid phase and the expansion and the heating of the liquid phase take place at a temperature close to the saturation value of the liquid phase.

4. The method according to claim 1, wherein cooling and condensation of the $CO_2$ in the vapor phase occurs after under-cooling of the liquid $CO_2$ at 0 to 50° C.

5. The method according to claim 1, wherein the liquid $CO_2$ is fed to an extraction vessel in a ratio from 2 to 20 times by weight with respect to the cuttings during the mixing of the cuttings with $CO_2$.

6. The method according to claim 1, wherein the liquid $CO_2$ is moved using a volumetric pump between an accumulation tank and an extractor vessel during removal of the liquid phase from the cuttings.

7. The method according to claim 1, wherein the oily fraction is separated by the use of one or more separators.

8. The method according to claim 7, wherein at least one of the separators is configured to provide a cyclone effect.

9. The method according to claim 7, wherein the at least one separator comprises two separators, and one of the separators is configured to remove the $CO_2$ vapor by an inertial impact, and another one of the separators is configured to remove the $CO_2$ vapor by a cyclone effect.

10. The method according to claim 7, wherein a filter configured to separate liquid from the $CO_2$ vapor is situated down-stream of at least one of the separators.

* * * * *